United States Patent [19]
Claes et al.

[11] Patent Number: 5,326,138
[45] Date of Patent: Jul. 5, 1994

[54] HIGH PRESSURE COUPLING FOR PLASTIC PIPE AND CONDUIT

[75] Inventors: Timothy S. Claes, Findlay; Dean A. Orians, Carey; Stephen W. Switzer, Findlay, all of Ohio

[73] Assignee: Hancor, Inc., Findlay, Ohio

[21] Appl. No.: 962,984

[22] Filed: Oct. 16, 1992

[51] Int. Cl.$^5$ ............................................. F16L 17/03
[52] U.S. Cl. ..................................... 285/110; 285/319; 285/903; 285/921; 285/423; 285/910
[58] Field of Search ............... 285/903, 319, 308, 307, 285/321, 110, 910, 921, 423; 277/179, 205, 206, 228, 229

[56] References Cited

U.S. PATENT DOCUMENTS

| | | | |
|---|---|---|---|
| 1,931,922 | 10/1933 | Damsel et al. | 285/910 X |
| 3,239,254 | 3/1966 | Campbell | 285/424 X |
| 3,389,923 | 6/1968 | Love et al. | 285/321 |
| 3,447,819 | 6/1969 | Borsum et al. | 285/321 X |
| 3,785,682 | 1/1974 | Schaller | 285/903 X |
| 4,368,894 | 1/1983 | Parmann | 285/231 X |
| 4,487,421 | 12/1984 | Housas et al. | 285/110 X |

FOREIGN PATENT DOCUMENTS

| | | | |
|---|---|---|---|
| 275055 | 7/1988 | European Pat. Off. | 285/319 |
| 3605330 | 8/1987 | Fed. Rep. of Germany | 285/903 |
| 1260290 | of 0000 | United Kingdom | 285/110 |

Primary Examiner—Dave W. Arola
Attorney, Agent, or Firm—Fay, Sharpe, Beall, Fagan, Minnich & McKee

[57] ABSTRACT

A coupler (A) defines a bell (C) having a cylindrical wall (40) of substantially the same inner diameter as an outer diameter of peaks (22) of a length of corrugated tubing (B). The corrugated tubing includes a gasket (30) received in a valley (24) near one end thereof. The gasket includes a flange portion (32) which is compressed into the valley by the side wall (40) as the end of the tubing is slid into the coupler (A). The coupler includes an annular groove (44) which is in alignment with the gasket when the inner end of the tubing engages a stop (10). The flange is resiliently biased outward into groove (44) where an outward facing groove engaging surface (46) of the gasket engages an inward facing gasket engaging surface (48) of the groove. The gasket may include a stiffer higher durometer rubber portion (52) for biasing the flange more stiffly into the groove and to transfer axial load to the bell more stiffly.

17 Claims, 3 Drawing Sheets

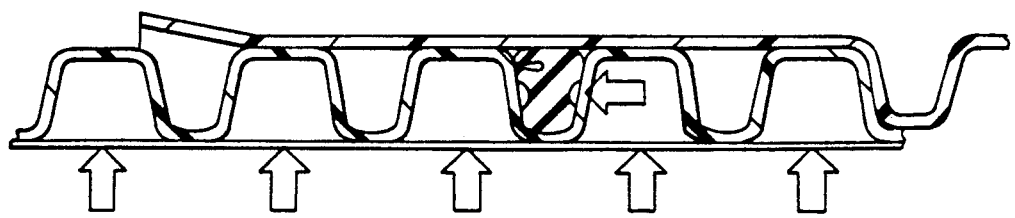
FIG. IA
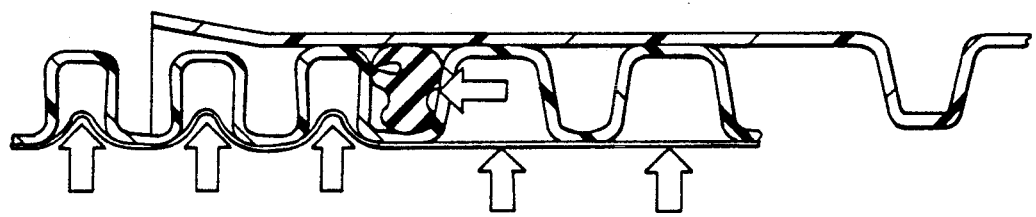
FIG. IB
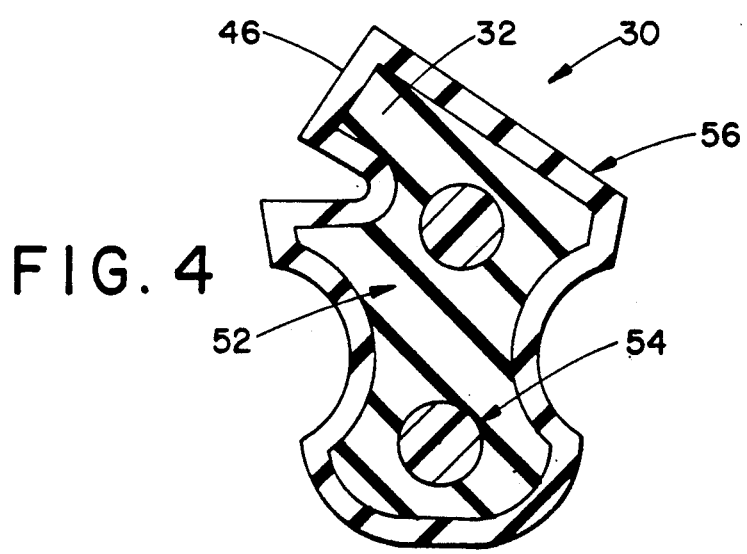
FIG. 4

5,326,138

HIGH PRESSURE COUPLING FOR PLASTIC PIPE AND CONDUIT

BACKGROUND OF THE INVENTION

The present invention relates to the art of connecting tubing, pipes, and conduit. It finds particular application in conjunction with the interconnection of large diameter, smooth interior wall corrugated plastic tubing and will be described with particular reference thereto. However, it is to be appreciated, that the invention will also find application in conjunction with smooth-walled, corrugated, and other types of pipe and tubing.

Large diameter plastic pipe, e.g. 24 inch (60 cm) plastic pipe, is commonly shipped and handled in sections, e.g. 20 foot (6.5 m) sections. Each length has a stiff, self-supporting outer wall which includes alternating peaks and valleys that define a series of corrugations. Optionally, a lighter-weight continuous tubular liner extends along and is connected with the valleys to define a smooth interior diameter. Tubing with a smooth interior diameter has a substantially higher fluid carrying capacity than tubing with a corrugated interior of the same diameter.

To connect the lengths of tubing, external, sleeve-type couplers are commonly utilized. These couplers include a plastic sleeve or bell whose inner diameter substantially matches the outer diameter of the corrugation peaks of the tubing lengths to be connected. Typically, a corrugation or groove is defined in the center of the coupler to mark the center and to provide an abutment for the ends of the connected tubing lengths. To provide a fluid tight seal, an annular gasket is disposed in one of the corrugation valleys which will be received within the coupler. Generally, the tighter the gasket presses against the cylindrical interior surface of the coupler, the more pressure the joint will hold. To this end, the gasket is commonly defined such that it substantially fills the corrugation valley and has an outwardly cammed flap or projection. As the end of the tubing length is inserted into the coupler (or the coupler inserted around the end of the tubing length), the gasket is compressed into the valley and firmly against the interior cylindrical surface of the bell.

In the past, attempts to improve the seal and raise the failure pressure have focused on the gasket. In particular, the gaskets are now compressed sufficiently that water does not flow between the gasket and bell. To facilitate insertion with this high compression of the gasket, the interior surface of the coupler bell is commonly coated with a lubricant. This facilitates pressing the coupling and the end of the pipe together, typically with axial pressure from a backhoe. Although the gasket/bell interface withstands well over 10 psi, the couplings still fail at about 10 psi.

The inventors herein have discovered an unexpected failure mode. With reference to FIGS. 1A and 1B, the internal pressure in the pipe feeds back around the end of the pipe to the gasket. The gasket acts like a piston in the coupler sleeve. The pressure tried to push the piston or gasket out of the coupler sleeve in a direction which tries to compress the pipe axially. This first axial compressive force is combined with a second force which also urges the pipe to compress axially. The annular chambers defined between the smooth inner liner and the corrugation peaks typically have a very small weep hole to allow the pressure within these annular regions to equalize with the external environment. As the pressure in the interior of the pipe increases, there is an increasing pressure differential between the interior of the pipe and the annular regions below the corrugation peaks. This pressure differential causes the inner liner to arc into the annular regions and the corrugation peaks in the coupler bell to draw together axially or fold in an accordion-type style. Backfill around corrugations outside the coupler tend to fill the corrugation valleys and resist this accordion-type contraction. The corrugations on the high pressure side of the gasket are not subject to the first axial compressive force and are only subject to the second compressive force until the pressure equalizes through the weep hole.

As these two axial pressures cause the corrugations to contract in an accordion-like manner, the length of tubing section becomes shorter. Because the central region of the tubing section is well anchored by the backfill, the gasket and the end of the tubing move toward the central portion of the section and are withdrawn from the coupler. In a double bell connector, the end of the tubing connected to the other bell is withdrawn analogously, but in the opposite direction. This axial compression or shortening of the pipe continues until the gasket is pulled from the bell or until the pipe compresses further on one side than the other. Such uneven compression or crushing of the pipe causes a rotation of the gasket out of the vertical plane (when the longitudinal axis of the pipe is horizontal) which pulls the gasket away from the bell. The lubrication which was used to allow the gasket to seal more completely to the interior surface of the bell actually facilitates the movement of the gasket and failure of the joint. In this manner, the solution dictated by the conventional wisdom discussed above, i.e. compressing the gasket so hard that a lubricant is required for its insertion, is actually promoting the failure.

The present invention contemplates a new and improved coupling arrangement which overcomes the above-referenced problems.

SUMMARY OF THE INVENTION

In accordance with the present invention, a new and improved coupling for smooth interior diameter corrugated tubing is provided. The coupling arrangement defines an annular bell having an inner diameter which is substantially the same as an outer diameter of the corrugated tubing. The coupling bell defines an outward projecting notch or groove on its interior surface. An annular gasket received in a corrugation valley of the corrugated tubing includes an outward projecting portion which is received into the bell annular groove. Compressive loading on the pipe is transferred through the gasket to the coupler bell.

In accordance with another aspect of the present invention, the groove has a relatively flat surface facing toward a cut end of the inserted tubing and the gasket has an outward projecting, rearward angled flange with a generally flat rear surface. The gasket flange surface and the annular groove flat surface interact to lock the tubing against axial contractive movement.

In accordance with another aspect of the present invention, the gasket has a central stiffening portion to facilitate transferring axial forces to the coupler and a soft outer covering to provide a fluid tight seal at low pressures.

In accordance with another more limited aspect of the present invention, the bell has a plurality of grooves such that the gasket substantially aligns with one of the grooves, regardless where in a corrugation cycle the tubing is cut.

One advantage of the present invention is that it inhibits failure of the coupling of smooth interior corrugated tubing.

Another advantage of the present invention is that it enables fluids to be carried through the tubing at higher pressure.

Another advantage of the present invention is that it provides a positive indication that an end of the tubing has been received in a coupled relationship with the coupling bell.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

FIGS. 1A and 1B illustrate the newly discovered failure mode of prior art coupling bells;

FIG. 4 is a detailed illustration of an alternate gasket construction;

DETAILED DESCRIPTION OF THE PREFERRED EMBODIMENTS

Figure 2:
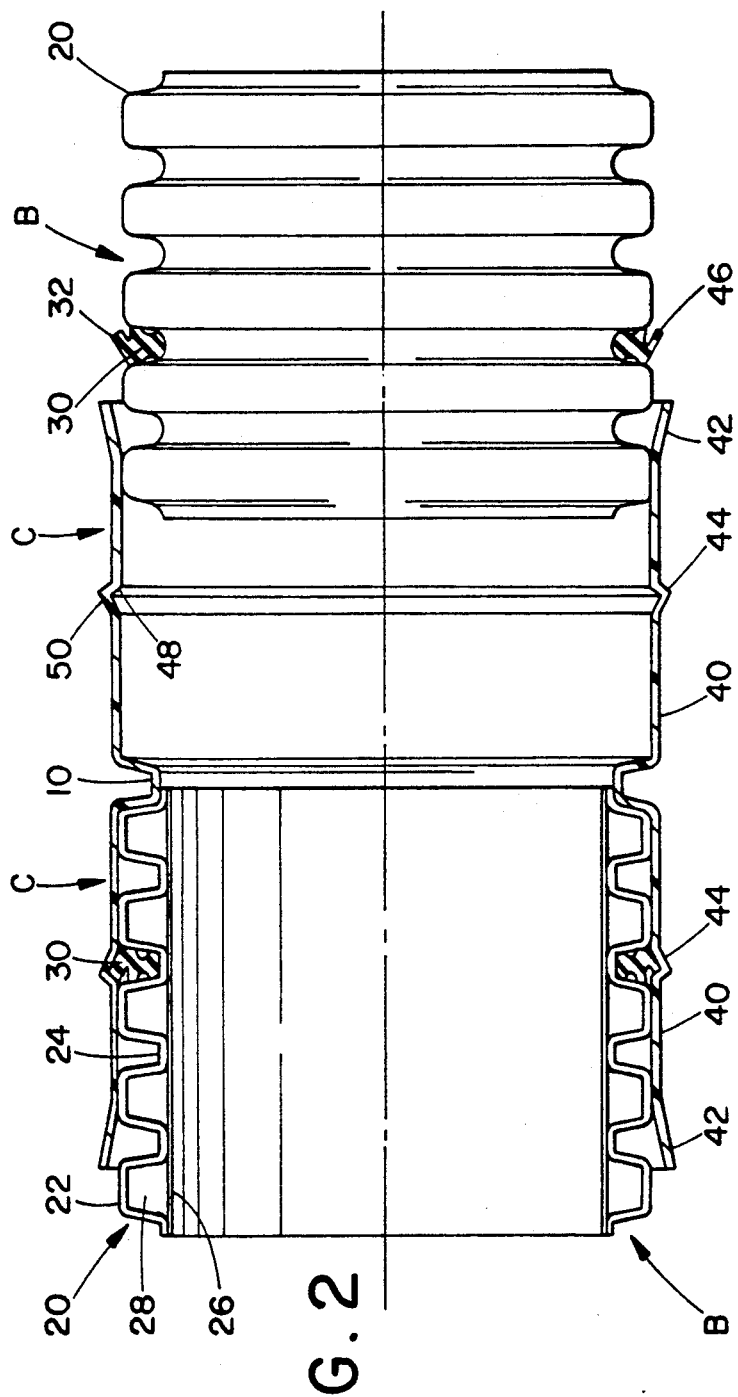
FIG. 2 is illustrative of a double bell coupler in combination with two lengths of smooth interior diameter corrugated plastic tubing in accordance with the present invention.

With reference to FIG. 2, a double bell coupler A receives ends of a first and second lengths of corrugated tubing B in opposite facing coupling bells C. The double bell coupler A defines an inward valley or stop 10 annularly around its geometric center. The stop 10 serves to limit the extent of engagement of the tubing ends to assure that each is received to the same, proper depth.

Figure 3:
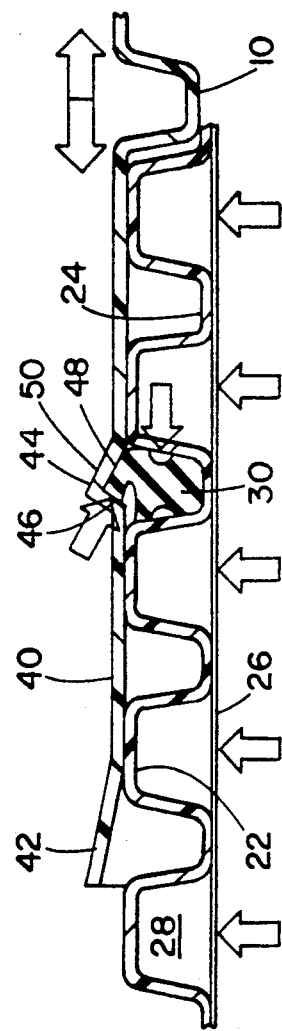
FIG. 3 is a detailed view illustrating interaction of the coupling bell, tubing end, and sealing gasket.

With continuing reference to FIG. 2 and further reference to FIG. 3, each length of corrugated tubing B includes a stiff, strong corrugated outer wall 20 made up of alternating ridge or peak portions 22 and recess or valley portions 24. The corrugated outer wall has sufficient strength to withstand flattening compression from surrounding earth. To provide for higher fluid carrying capacity, a cylindrical inner liner 26 extends along an inner diameter of the corrugation valleys and is integrally connected thereto. The cylindrical liner or wall 24 is lighter weight than the corrugated outer wall but still carries a significant part of the axial load. The inner liner 26 and each of peaks 22 define an annular region 28. Each peak contains a weep hole which allows pressure in the annular regions 28 to come into equilibrium the external pressure.

A gasket 30 is received in one of the corrugation valleys 24. The gasket is constructed, at least on its outer surfaces, of a soft rubber which is readily deformed by pressure. The gasket includes an angled, outward projecting flange or flap 32 which is compressed as the tubing is inserted into the coupler bell C.

The coupler bells C include a cylindrical wall portion 40 that has an inner diameter which is the same as or slightly larger than the outer diameter of the corrugation peaks 22. The cylindrical sleeve portion 40 has a flared outer end 42 to facilitate receipt of the end of the tubing lengths and compression of the gasket 30. An annular groove 44 is defined in an inner surface of the cylindrical side wall substantially in alignment with the gasket 30. Most commonly, the tubing sections are cut generally centrally in one of the valleys 24. The gasket is placed a preselected number of corrugations from the end, preferably in the second valley. The groove 44 in this embodiment is defined about two corrugations from the stop 10 such that the gasket flange 32 is received therein. As the end of a length of tubing and a coupler are pushed together, generally with a backhoe, the flared end of the coupler A compresses the gasket into valley 24. Continued axial pressure slides the tubing end and the coupler together until the gasket reaches the groove. The gasket expands rapidly or snaps into the groove producing an audible indication that the insertion is complete.

In the preferred embodiment, the gasket flange 32 has a generally flat end wall 46 and the groove has a generally flat end wall 48. The relative angle of the end wall 48 is selected such that the gasket end wall 46 abuts it squarely. In the embodiment of FIG. 3, the groove further defines a forward wall 50 which is positioned to limit outward movement of the flange member 32.

When the pressure in the tubing increases, there is increased force on the piston and a greater pressure differential between the tubing interior and the annular regions 28. As the pressure continues to increase, there is a tendency for the inner liner 26 to buckle into the regions 28 and for the side walls of the corrugation to move together. The backfill tends to fill the corrugation valleys of the central portion of the tubing lengths away from the coupler providing increased resistance to axial compression. The axial compression of the tubing tends to cause the end of one (or both) of the tubing lengths to pull out of the coupler. The insufficient strength relative to axial compression permits the side walls of the corrugations to move together, compressing the corrugations axially and allowing the tubing to contract or shorten in length. The interaction of the gasket flange 32 and the groove 44 transfers the axial compressive forces to the side wall 40 of the coupler bell C. The side wall 40 of the bell, having a thickness and strength which is preferably double to the inner liner or wall 26, has sufficient strength to resist axial movement or compression. Of course, other means may be provided for transferring the axial load to the side wall of the coupler.

With reference to FIG. 4, to improve the transfer of the axial force to the cylindrical side wall 40 of the coupler, the gasket 30 preferably has a stiff inner core 52, such as a high durometer or hard rubber. Reinforcing belts or fibers 54 add further stiffness to the gasket. Because high durometer rubber tends to provide a relatively poor friction seal under low pressures against fluid leakage, the gasket has a soft or low durometer outer coating 56. This soft, almost tacky outer coating forms a fluid tight seal with the side wall 40 and groove 44 even under minimal pressures.

Figure 5:
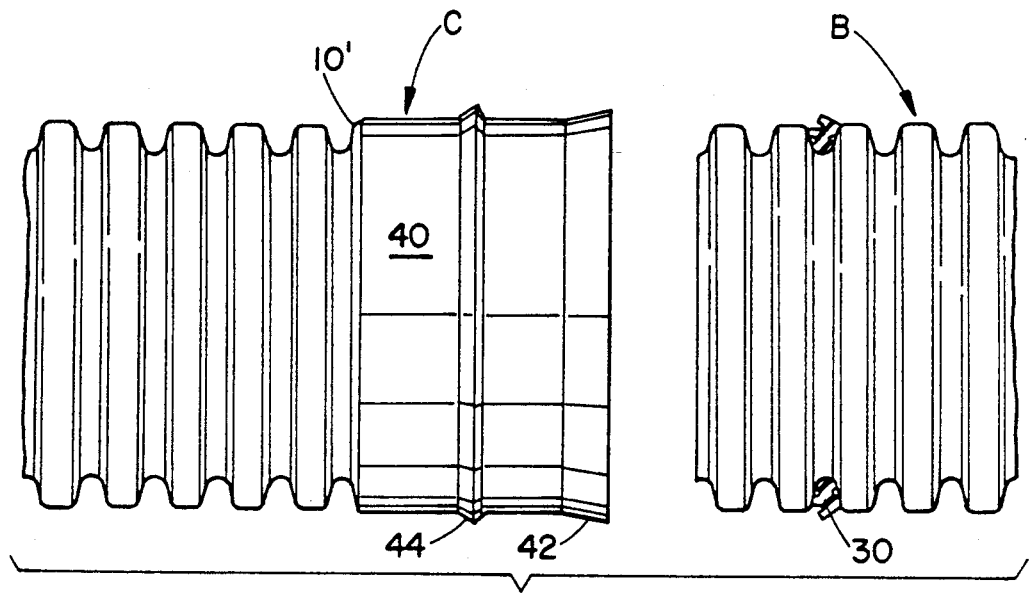
FIG. 5 illustrates the coupling of the present invention as an integral bell coupling on a length of corrugated tubing.

In the embodiment of FIG. 5, the bell C is integrally formed or otherwise permanently affixed on the end of a length of corrugated tubing 58 or other associated structure. Preferably, the tubing B again has an inner liner for higher fluid carrying capacity. An end corrugation of the tubing defines a stop 10' at the interface between a cylindrical side wall 40 of the bell C and the tubing 58. The cylindrical side wall 40 defines an annular groove 44 peripherally therearound.

Figure 6:
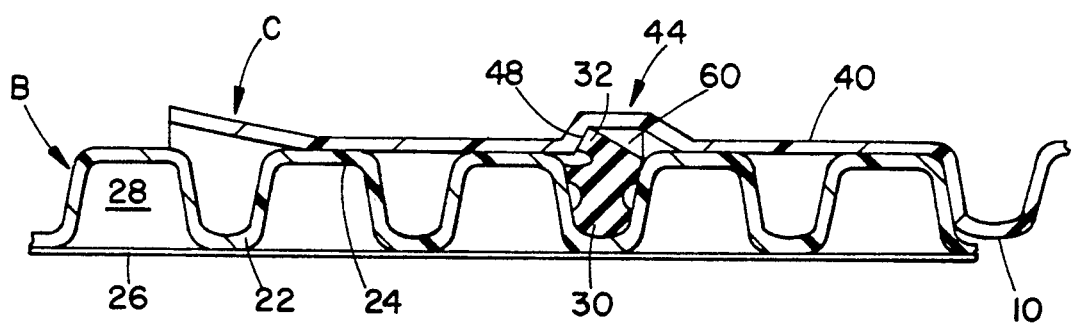
FIG. 6 illustrates an alternate embodiment of the groove of the coupler bell; and, FIG. 7 illustrates another alternate embodiment of the coupler bell.

In the embodiment of FIG. 6, the annular groove 44 in the bell A is enlarged. This provides an annular region 60 behind the flange 32. This annular region provides an increased tolerance for alignment of the gasket and the groove. As the pressure within the tubing increases, the pressure in the region 60 increases forcing the flange portion 32 into tighter, more rigid frictional contact with the mating surface 48 of the groove 44.

Figure 7:
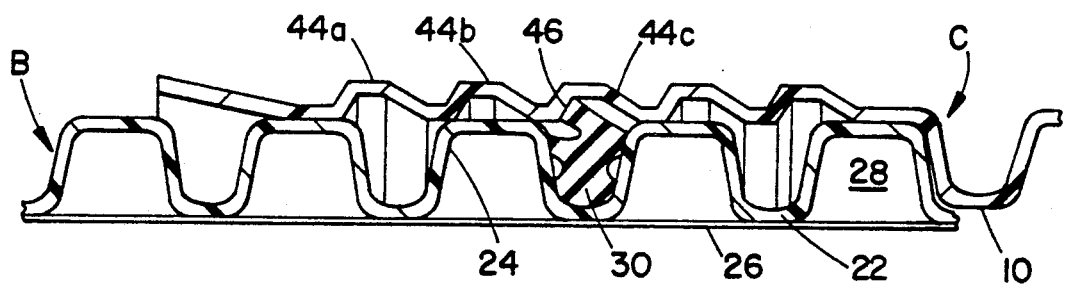

With reference to FIG. 7, in the field, the ends of the tubing sections are not always cut in the center of a valley. Like diameter tubing with different corrugation pitch may be available from different manufacturers. The gasket can be positioned in other than the second valley from the cut end. To accommodate these various potential combinations, the coupler bell C of FIG. 7 includes a plurality of annular grooves 44a, 44b, etc., with a spacing from the stop 10 that is different from the pitch of the corrugations of the received tubing B.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A tubing coupling system comprising:
   a first bell having a generally cylindrical interior surface and defining an annular groove peripherally around the interior surface;
   a first length of corrugated tubing having a corrugated side wall defined by alternating, annular peak and valley portions and a smooth flexible inner liner connected with an inner surface of the valley portions to define a smooth, cylindrical interior fluid carrying surface, annular chambers being defined between the inner liner and each peak portion, under internal fluid pressure, the liner is urged into the annular chambers urging the valleys to move toward each other reducing a width of the peaks which urges the corrugated tubing length to shorten which shortening of the corrugated tubing length is resisted by backfill in the valley portions;
   a first gasket received in one of the corrugation valley portions adjacent an end of the corrugated tubing length, the gasket having a resilient, outward projecting flange, the flange being resiliently biased to project outward beyond an outer diameter of the peak portions and an inner diameter of the bell cylindrical interior surface, the internal fluid pressure pushes fluid around the tubing end and against an inner surface of the gasket causing the gasket to function as a piston urging the corrugated tubing length to contract and urging the tubing end out of the bell, the valleys adjacent the tubing end which are received in the bell being shielded by the bell from receiving backfill which resists shortening, the flange portion being compressed into the one valley portion as the end of the corrugated tubing length is received into the bell until the gasket and flange portion reach the annular groove and the gasket flange portion being resiliently biased into the groove such that the flange portion interacts with the annular groove to block decoupling sliding movement of the gasket relative to the bell preventing the tubing length from contracting.

2. The coupling system as set forth in claim 1 wherein the flange portion is connected with the gasket at an end toward the tubing end and extends at an angle away from the tubing end.

3. The coupling system as set forth in claim 2 wherein the flange portion has a groove engaging surface facing generally away from the tubing end and wherein the groove has a matching gasket engaging surface facing generally toward the received tubing end.

4. The coupling system as set forth in claim 2 wherein the coupling means includes an inward projecting stop which abuts the received tubing end, the groove being substantially an integral number of corrugations from the stop such that the groove aligns with one of the tubing valleys when the received tubing end abuts the stop.

5. The coupling system as set forth in claim 2 wherein the groove defines an enlarged portion towards the received tubing end.

6. The coupling system as set forth in claim 2 wherein the bell portion includes an internal stop for limiting receipt of the tubing length and a plurality of annular grooves to accommodate gaskets in different valleys of the tubing length and in tubing lengths with different corrugation pitches when the tubing length is inserted into the bell with the tubing end abutting the internal stop.

7. The coupling system as set forth in claim 2 wherein the gasket includes a relatively stiff inner portion surrounded by a relatively soft, low durometer rubber outer portion.

8. The coupling system as set forth in claim 1 further including
   a second bell having a generally cylindrical interior surface and defining a second annular groove peripherally around the cylindrical interior surface;
   a second length of corrugated tubing having a corrugated side wall defined by alternating, annular peak and valley portions and a cylindrical inner liner connected with an inner surface of the valley portions, annular chambers being defined between the cylindrical inner liner and each peak portion;
   a second gasket received in one of the corrugation valley portions adjacent an end of the second corrugated tubing length, the second gasket having a resilient, outward projecting second flange, the second flange being resiliently biased to project outward beyond an outer diameter of the peak portions and an inner diameter of the second bell, the second flange portion being compressible into the one valley portion as the end of the second corrugated tubing length is inserted into the second bell until the second gasket and flange portion reach the annular groove and the gasket flange portion is resiliently biased into the second annular groove.

9. The system as set forth in claim 1 wherein the bell is integrally connected to an associated structure.

10. A tubing coupling system comprising:
   a first bell having a generally cylindrical interior surface and defining a groove around a peripheral of the interior surface;
   a first length of corrugated tubing having a corrugated side wall defined by alternating, annular peak and valley portions;
   a first gasket received in one of the corrugation valley portions adjacent an end of the corrugated tubing length, the gasket having a resilient, outward projecting flange portion, the flange portion being connected with the gasket at an end toward the tubing end and extending at an angle away from the tubing end, the flange portion being resiliently biased to project outward beyond an outer diameter of the peak portions and an inner diameter of the bell cylindrical interior surface, the flange portion being compressible into the one valley portion as the end of the corrugated tubing length is received into the bell until the gasket and flange portion reach the groove and the gasket flange portion is resiliently biased into the groove, the gasket including a relatively stiff inner portion including a high durometer rubber surrounded by a relatively soft, low durometer rubber outer portion.

11. The coupling system as set forth in claim 10 wherein the gasket further includes annularly extending reinforcing means within the high durometer rubber portion.

12. In a tubular coupling system in which an end of a length of axially compressible corrugated tubing is received axially in a smooth cylindrical bore of a coupler bell with a gasket compressed between a valley of the corrugated tubing and the smooth cylindrical bore of the coupler bell, internal fluid pressure within the tubing acts on the gasket such that the gasket functions in the cylindrical bore as a piston subjecting corrugations immediately adjacent the gasket in a direction away from the tubing end to axial loading that compresses the corrugations immediately adjacent the end axially in response to the internal pressure foreshortening the tubing sufficiently to pull the gasket out of the smooth cylindrical bore of the bell, the improvement comprising:
   a means for transferring the axial loading from the corrugated tubing adjacent the gasket to the coupler bell such that the bell carries axial loading in tension preventing the corrugations adjacent the gasket on the side opposite the side subjected to the fluid pressure from compressing.

13. In the coupling system as set forth in claim 12, the improvement comprising the axial load transfer means including a groove defined annularly around the bell in alignment with the gasket and a portion of the gasket which projects outwardly into the groove such that the gasket transfers axially compressive force from the corrugated tubing to the bell.

14. In the coupling system as set forth in claim 13, the improvement comprising, the flange portion being connected with the gasket at an end toward an end of the tubing length and extends at an angle away from the tubing end.

15. In the coupling system as set forth in claim 14, the improvement further comprising, the flange portion having a groove engaging surface facing generally away from the tubing end and wherein the groove having a matching flange engaging surface facing generally toward the received tubing end.

16. A coupler system comprising:
   a coupler having a stop and a bell extending therefrom, the bell defining a cylindrical inner wall in which an outward annular groove is defined, each annular groove having a gasket engaging surface which faces generally toward the stop;
   a length of corrugated pipe having a corrugated outer wall and a smooth inner liner affixed interior to and lining the corrugated outer wall, the inner liner providing a smooth surface to fluid flowing therethrough to reduce drag and improve fluid flow capacity relative to the corrugated outer wall, the inner liner being sufficiently thin that the corrugated outer wall provides support that prevents the inner liner from being collapsed by backfill and from rupturing under internal pressure of the fluid flowing therethrough;
   a gasket received in a valley of the length of corrugated pipe and inserted with a tight frictional fit into the coupler bell, the internal fluid pressure acting on the gasket such that the gasket converts a portion of the internal fluid pressure into an axial force which urges the gasket and an end of the corrugated pipe adjacent the gasket to move axially away from the stop, the gasket including an outward projecting flange which slopes outward and away from the coupler stop, the annular flange having a groove engaging surface facing generally away from the coupler stop and engaging the gasket engaging surface of the groove such that the gasket transfers the axial force to the coupler bell such that the coupler bell strengthens the corrugated pipe adjacent the gasket against axial compression.

17. A method of coupling corrugated plastic tubing which has a corrugated outer wall, the method comprising:
   inserting a resilient gasket into a valley of the corrugated outer wall closely adjacent an end of the tubing, the gasket extending radially outward beyond adjacent peaks of the corrugated outer wall;
   inserting the tubing end into a cylindrical coupler bell compressing the gasket into the valley;
   continuing to insert the tubing end further into the cylindrical coupler bell until the gasket aligns with an annular groove in the bell, the gasket snapping resiliently into the groove;
   conveying fluid under pressure through the tubing such that the fluid under pressure places an axial force on an inner surface of the gasket in communication with the fluid, which axial force urges the tubing end to compress axially and the gasket to slide out of the bell;
   transferring a portion of the axially force through the gasket to the coupler bell such that structural strength of the coupler bell under tension combines with structural strength of all the tubing end under compression to hold the tubing extended against the axial force and anchors the gasket against sliding relative to the coupler bell.

* * * * *